June 15, 1943.  A. A. CARLSON  2,321,653

AIR CLEANER

Filed July 29, 1941  4 Sheets-Sheet 1

Inventor
Albin A. Carlson
By Liverance and
Van Antwerp
Attorneys

June 15, 1943.  A. A. CARLSON  2,321,653
AIR CLEANER
Filed July 29, 1941  4 Sheets-Sheet 3

Inventor
Albin A. Carlson
Attorneys

UNITED STATES PATENT OFFICE 2,321,653

AIR CLEANER

Albin A. Carlson, Muskegon, Mich.

Application July 29, 1941, Serial No. 404,492

1 Claim. (Cl. 183—21)

This invention relates to air cleaning and more particularly to cleaning air in which dust and heavier particles of matter are carried. For example, in grinding machines or machines of similar character in metal grinding, there is separation of metal particles from the body of the work which desirably are carried away from the machine so as not to intermingle with the air of the factory where the machine is working.

With my invention this dust laden air is carried in a suitable tubular conduit to the air cleaner which I have devised, drawn therethrough, the metal dust and any heavier metal parts being removed from the air so that on the discharge of the air from the cleaner, it is freed of such contamination, the dust and other particles being arrested and held in the air cleaner from which they may be periodically removed when necessary. The cleaner, it is to be understood, is not limited to cleaning air with metal dust therein but may be used in many other places.

My invention is directed to a very practical and effective air cleaner for attainment of the purification of dust laden air. The air cleaner which I have devised may be manufactured and assembled economically and has proved particularly satisfactory for the purposes for which it was designed.

An understanding of the invention and of a preferred construction embodying the same may be had from the following description taken in connection with the accompanying drawings, in which, Fig. 1 is an elevation of the air cleaner constructed in accordance with my invention.

Like reference characters refer to like parts in the different figures of the drawings.

Figure 1:
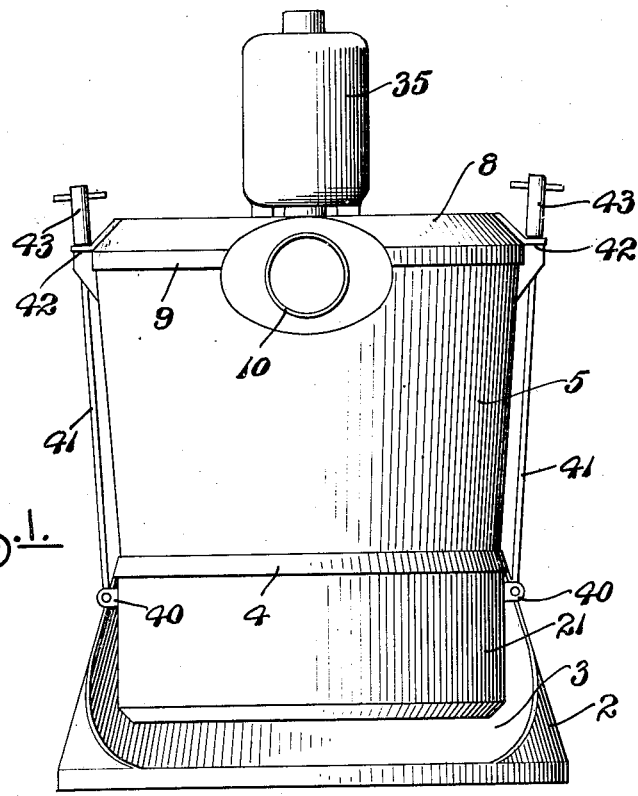
Figure 2:
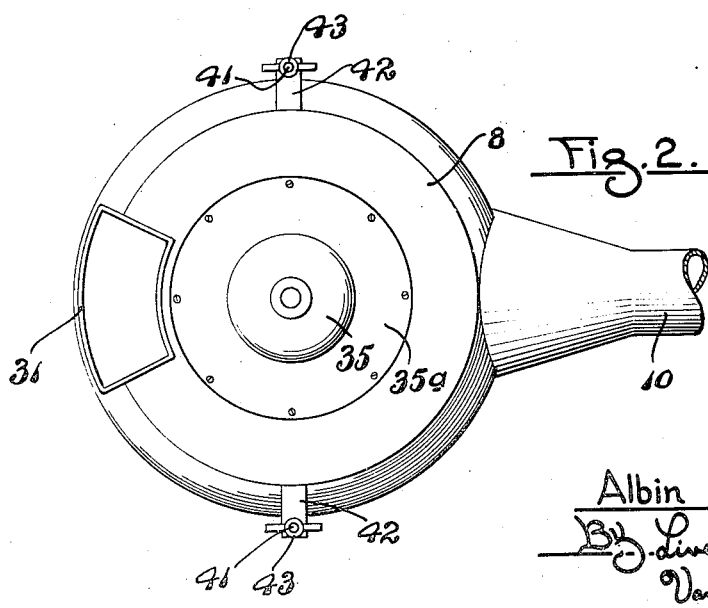
Fig. 2 is a plan view thereof.

In the preferred construction of air cleaner which I have produced, a base ring 1 preferably made of a length of channel has connected thereto a supporting member 2 of sheet metal of frustro-conical outline which at one side is cut away as indicated at 3, leaving at the upper side of the opening 3 a downwardly and outwardly extending flange 4 which is integral with the part 2. Into the upper end of the sheet metal supporting member 2 the lower end portion of a substantially cylindrical shell 5 of sheet metal is inserted for a short distance and the parts are welded together, as at 6, providing between the lower end of the shell 5 the upper end of the member 2 and the flange 4 a continuous annular recess which is filled with packing 7. The shell 5 is open at both its upper and lower ends and at its upper end is equipped with a cover 8 in which a central circular opening is made. The outer portions of the cover 8 extend downwardly and outwardly and terminate in a continuous flange 9 extending over the upper end of the shell 5 and permanently secured thereto by welding, soldering or equivalent connection. The air which is to be cleaned is carried through a pipe conduit 10 shown in Fig. 3 as at one side of the upper end of the shell 5 and the top 8, and said top 8 oppositely is provided with an opening 11 for the air exit after it is passed through the cleaner Within the outer shell or casing 5, a vertically positioned sheet metal sleeve 12 is located and is permanently secured in place by connection to the outer casing 5, there being used a plurality, four in practice, of channel shaped bars 13 between the parts permanently connected to each. The lower end of the member 12 extends nearly to the lower end of the outer casing shell 5, while the upper end terminates a distance below the upper end thereof. At the lower end portion and at the inner side of the sleeve 12 a downwardly and inwardly inclined ring 14 is connected providing a continuous annular groove between it and the lower end of the sleeve 12 in which packing 16 is held.

Figure 3:
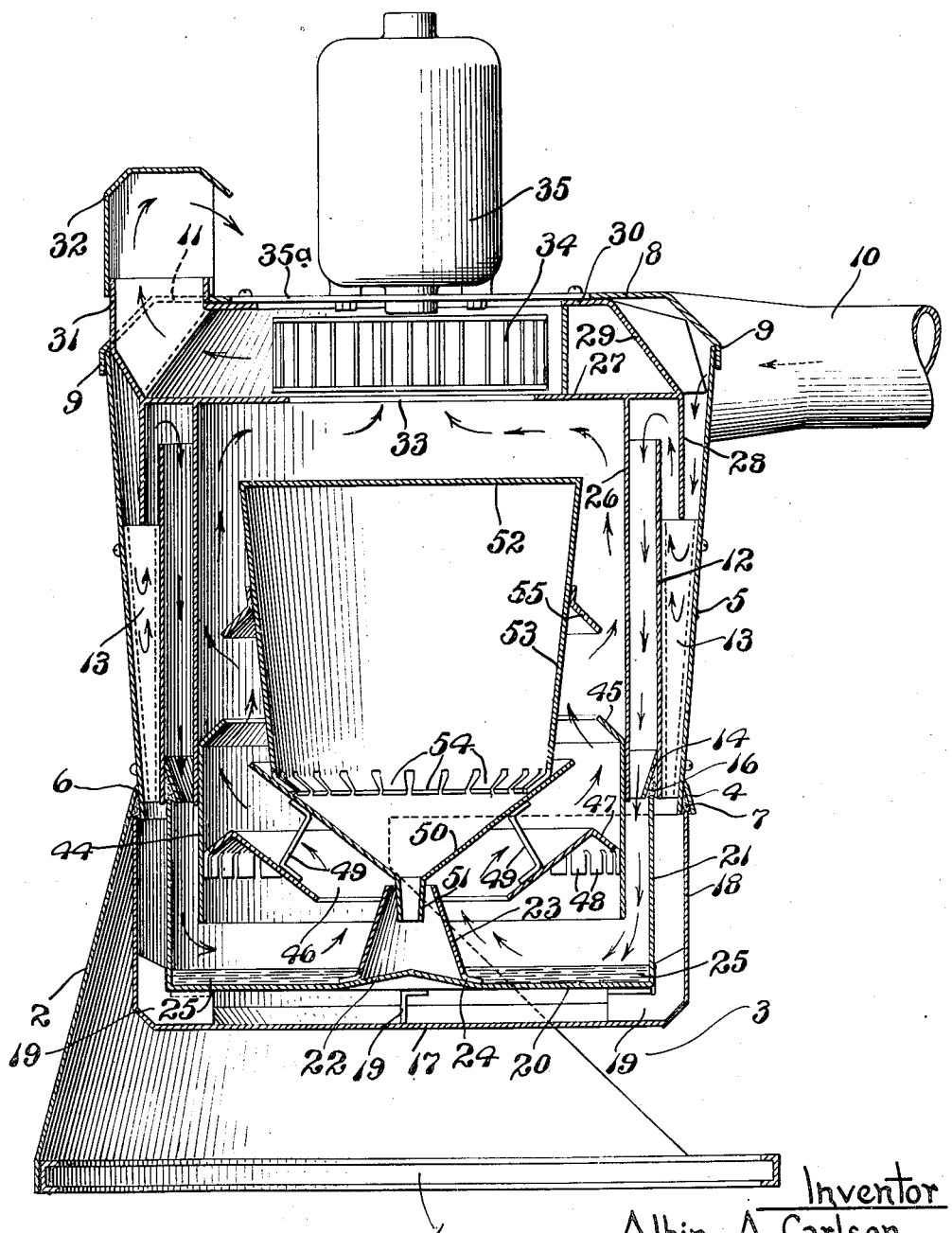
Fig. 3 is an enlarged central vertical section therethrough.
Figure 4:
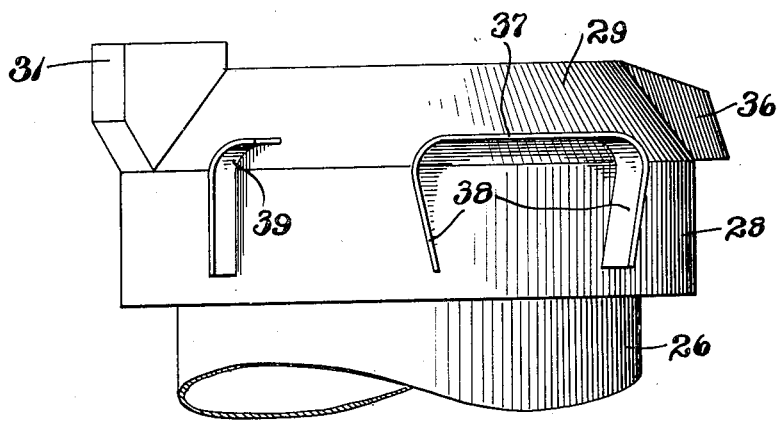
Fig. 4 is a fragmentary elevation of an inner member of the air cleaner which is housed within the outer casing.
Figure 5:
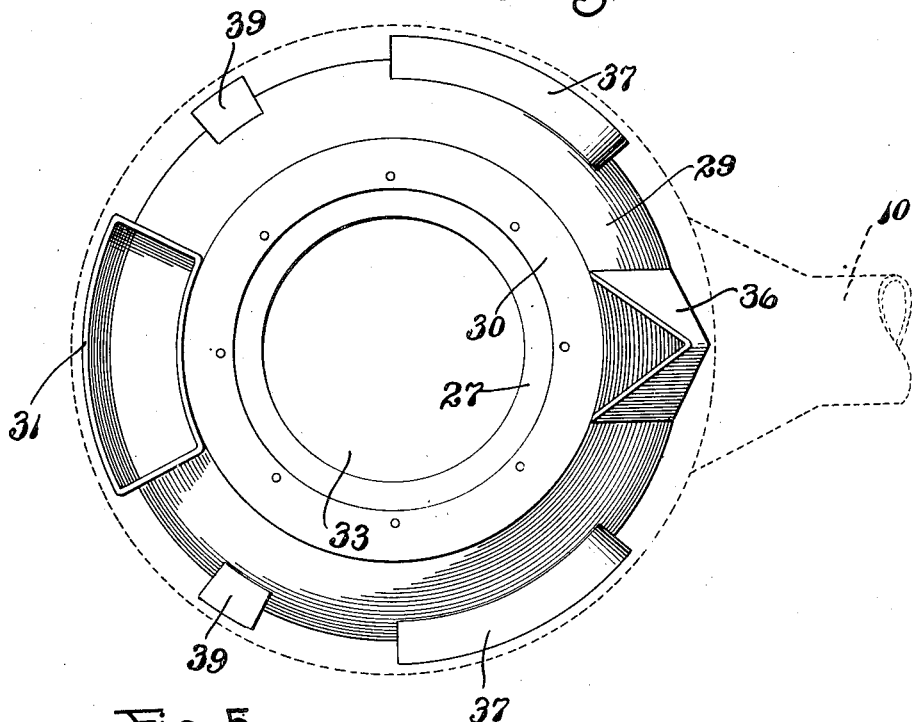
Fig. 5 is a plan view thereof.

A cup-like receptacle having a horizontal bottom 17 and vertical walls 18 is located below the outer shell or casing 5 with the upper edges of the walls 18 engaging the packing at 7. Within such member are four supporting brackets 19 of sheet metal at its lower corners, spaced apart from each other, upon which a second receptacle rests having a bottom 20 and vertical walls 21, the upper edges of which engage against the packing at 16. The central portion of the bottom 20 is pressed upwardly into rather flat conical form, as indicated at 22, on which a frustro-conical member 23 is mounted at its lower edges having outwardly and downwardly extending spaced ears 24 welded to the part 22, the upper end of the part 23 being open as shown. The second receptacle in the use of the air cleaner is partially filled with oil as shown at 25, the level being kept low or in general below the ears 24 as shown in Fig. 3.

Within the sleeve 12 is a second cylindrical sleeve 26 spaced from said sleeve 12, the lower edges of which reach substantially the same horizontal plane as the lower edges of said sleeve 12. The lower end of sleeve 26 is open but the upper end is closed by a horizontal plate 27 welded or otherwise permanently secured thereto and having outer portions extending beyond said sleeve 26 or toward the outer casing 5 but terminating short thereof, and having a downwardly turned terminal skirt 28 which extends to and at its lower edges rests upon the channel connecting bars 13. A dome having downwardly and outwardly extending sides 29 is welded or otherwise equivalently connected at its lower edges to the outer edges of the plate 27 and has a top 30 with a central opening therethrough. An outlet for the air is provided at 31 connected with the dome and passing upwardly through the opening at 11 previously described, being equipped with a hood 32 with an outlet opening for the cleaned air which has passed through the air cleaner.

The plate 27 has a central opening 33 directly over which is a fan 34 driven by an electric motor 35 which is mounted on a plate 35a seated in the opening in the top 8 of the casing and connected by screws to the top 30 of the described dome. The fan 34 when driven at high speed draws the air through the pipe 10 and through the cleaner, said air passing through the opening 33 and being forced outwardly through the air outlet at 31.

In line with the air carrying pipe 10 an air deflector or divider 36 of the shape shown is welded to a side of the dome 29 so that air drawn through the pipe 10 is caused to divide and move in opposite directions away from said deflector. A short distance from the deflector and at each side, an inverted substantially U-shaped deflector having a top 37 and downwardly somewhat converging legs 38 are attached to the dome. Beyond each of the inverted U-shaped deflectors and spaced a short distance therefrom a deflecting bar 39 with a curved laterally extending end portion is secured. These deflectors serve to distribute the air which comes through the pipe 10 around the dome 29 so that there will approach a uniformity of air passing downwardly all around the skirt 28. When the air is drawn in heavier particles of metal will fall downwardly between the outer casing 5 and the skirt 28 and thence between the casing 5 and the sleeve 12 to the outer receptacle and be collected at the bottom thereof.

To opposite sides and near the upper end of the wall 21 of said outer receptacle ears 40 are secured, to each of which the lower end of a rod 41 is pivotally connected (Fig. 1). Rods 41 extend upwardly through brackets 42 and are threaded at their upper ends to receive manually operable interiorly threaded nuts or sleeves 43 by means of which said dirt and dust collecting receptacles may be drawn upwardly to tightly press the upper edges of the vertical walls 18 and 21 against the packings 7 and 16 respectively. By releasing and unscrewing the threaded sleeves 43, said reecptacles are disconnected from the rest of the air cleaner and may be removed for cleaning and replacement of fresh oil when needed.

At the lower portion of the inner sleeve 26 a cylindrical sleeve 44 of sheet metal is telescopically received and secured, its lower end being open and its upper end being bent and inclined upwardly and inwardly as at 45 making an inclined baffle. The lower end of the part 44 extends toward but is spaced a distance above the level of the oil 25. Within the sleeve 44 a member of sheet metal is disposed having a central conical section 46 from the upper edges of which a rim 47 extends downwardly and outwardly terminating in downwardly extending spaced apart ears 48 which lie against and are permanently secured to said sleeve 44. The conical central portion 46 is open at its lower side and surrounds the part 23 previously described.

A plurality of Z-shaped brackets 49 are connected in spaced relation to each other at their lower ends to the upper side of the central portion 46 of the last described member and at their upper ends have connected thereto a funnel 50 of sheet metal which at its lower end has a vertically positioned drainage spout 51 extending into the member 23. Centrally of the air cleaner and within the sleeve 26 a hollow member of sheet metal is located having a horizontal top 52 and downwardly slightly inwardly inclined side walls 53 at the lower edges of which are a plurality of spaced fingers 54 bent inwardly to lie against the funnel 50 to which they are permanently secured. At a distance above the baffle 45 a baffle 55 having a downwardly and outwardly inclined position, as shown in Fig. 3, is permanently secured to and around the walls 53. Said baffle 55 at its free edges is spaced a distance from the walls at 53. The ears at 24, 48 and 54 are spaced from each other by intervening slots which are cut deep enough so as to provide openings for the passage of oil from within the member 23 down the inclined sides of the conical portion 22, from the rim at 47 down the inner side of the sleeve 44 and from the outer side of the walls 53 to the inner sides of the funnel 50.

In operation the fan 34 draws air into the cleaner through the pipe 10 which is deflected and passes downwardly between the outer casing 5 and the skirt at 28 and thereupon turns and passes upwardly between the skirt 28 and sleeve 12 and thence downwardly between sleeves 12 and 26, its velocity being increased in passage through the narrowed annular space between the ring 14 and the sleeve 26 coming against the surface of the oil 25 which is stirred and agitated by the rushing air. The air laden with finely divided oil in suspension is carried upwardly between the section 46 and the funnel 50, is deflected by the baffle 45 and again by the baffle 55 and thence passes upwardly through the opening at 33 and out at 31 to the outlet of the hood 32.

The heavier particles as previously stated will fall into the outer receptacle and rest upon the bottom 17 thereof. The oil intermingles with the air and dust therein and collects the dust; and on its impingement against the sides of the member 23, the funnel 50, the baffle 45, the walls 53 and the baffle 55, the oil and dust adheres thereto and flows downwardly and is delivered back to the oil supply at 25, the air which leaves the air container being freed of dust.

The return of the oil to the main supply of oil is by reason of its collection on the numerous surfaces on which it impinges with drainage for passage of the oil at the inner ends of the slots which separate the ears 24, 48 and 54.

With this construction of air cleaner the dust and other impurities in the air is collected by the oil and returned to the body of the oil which from time to time must be replaced with fresh oil because of contamination. The receptacles are removed and cleaned and supplied with fresh oil.

Figure 6:
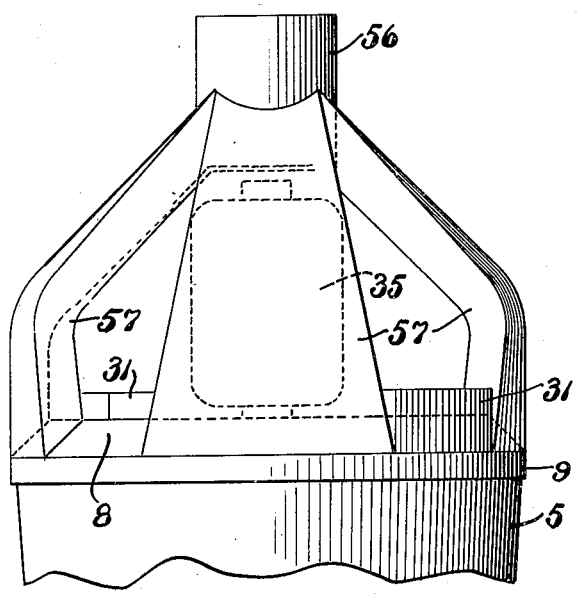
Fig. 6 is a fragmentary elevation of the air cleaner showing a slight modification in structure.
Figure 7:
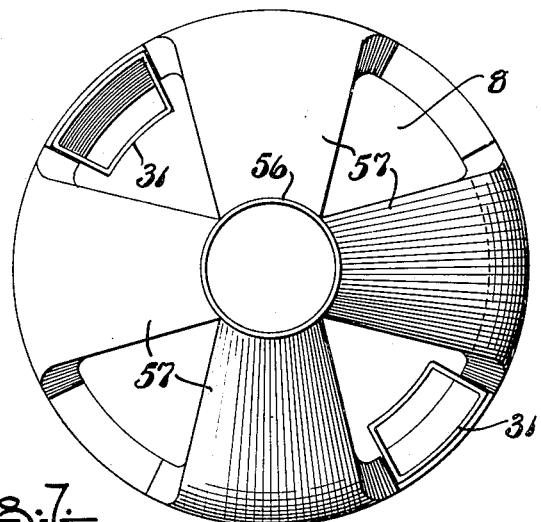
Fig. 7 is a plan view of the modified form of air cleaner shown in Fig. 6.

In Figs. 6 and 7 a modification is shown wherein the air is entered through a vertical pipe 56 from which a plurality of downwardly and outwardly extending branches 57, shown as four in number, lead to and around the annular space between the outer casing 5 and the skirt at 28. There may be more than one air outlet 31, as indicated in Figs. 6 and 7. Otherwise the construction is the same and also the operation.

It is also to be noted that in certain instances were the air contains very light and fine dust it may be necessary or at least desirable to insert a screen, or possibly several screens, within the inner receptacle above the body of the liquid and below the member 46. Screens located at this point could be easily removed and cleaned.

Various other forms of construction may be resorted to without departing from the invention. This construction of air cleaner has proven very practical, effective and useful. The invention is defined in the appended claim and is to be considered comprehensive of all forms of construction coming within its scope.

I claim:

In a construction of the class described, an outer substantially vertical casing having a closed top and provided with air inlet means adjacent the top, a vertical cylindrical member within and spaced from the walls of the outer casing, transverse means securing said cylindrical member to the outer casing, a receptacle having a bottom and substantially vertical side walls open at its upper end releasably connected at said upper end to the lower end of said casing, a second receptacle having a bottom and substantially vertical walls carried by and within and spaced from the first receptacle, said second receptacle being opened at its upper end, means for releasably holding the upper edges of the second receptacle in engagement with said cylindrical member providing a substantially air-tight joint, a cylindrical sleeve within the cylindrical member and spaced therefrom provided with a horizontal top at its upper end having a central opening therein, said top extending beyond the first mentioned cylindrical member and at its edges having a downwardly extending cylindrical apron resting upon said transverse means connecting the first mentioned cylindrical member and outer casing, a dome over said top engaging against the top closure of the casing, a suction fan mounted within said dome, means for driving said fan mounted on and above the casing, said dome having an air outlet, and means connected and associated with and extending below said cylindrical sleeve and upwardly therein whereby air drawn into the casing through said inlet means is directed downwardly into said inner receptacle and thence upwardly around said last mentioned means to said fan, the liquid in said inner receptacle against which the air impinges being agitated and a portion thereof carried in suspension in the air to collect dust from the air, said last mentioned means having a plurality of surfaces against which said liquid and dust laden air contacts, the liquid with the dust collected thereby adhering to said surfaces and draining by gravity back to the body of liquid in the inner receptacle.

ALBIN A. CARLSON.